(12) United States Patent
Tillotson

(10) Patent No.: US 6,747,960 B2
(45) Date of Patent: Jun. 8, 2004

(54) CLOSED LOOP POWER CONTROL FOR TDMA LINKS

(75) Inventor: Brian Jay Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 175 days.

(21) Appl. No.: 10/032,346

(22) Filed: Dec. 21, 2001

(65) Prior Publication Data
US 2003/0117981 A1 Jun. 26, 2003

(51) Int. Cl.[7] .......................... H04B 7/185; H04B 7/212
(52) U.S. Cl. ...................... 370/318; 370/321; 455/522
(58) Field of Search ................................. 370/316, 317, 370/318, 320, 326, 321, 330, 331, 332, 336, 345, 347; 455/436, 440, 443, 9, 10, 13.1, 13.4, 501, 504, 507, 522, 63.1, 67.13, 67.16

(56) References Cited

U.S. PATENT DOCUMENTS

| | | |
|---|---|---|
| 3,972,045 A | 7/1976 | Perret |
| 4,392,139 A | 7/1983 | Aoyama et al. |
| 4,654,484 A | 3/1987 | Reiffel et al. |
| 4,743,906 A | 5/1988 | Fullerton |
| 4,866,515 A | 9/1989 | Tagawa et al. |
| 4,901,307 A | 2/1990 | Gilhousen et al. |
| 4,958,381 A | 9/1990 | Toyoshima |
| 5,027,124 A | 6/1991 | Fitzsimmons et al. |
| 5,127,021 A | 6/1992 | Schreiber |
| 5,146,234 A | 9/1992 | Lalezari |
| 5,230,076 A | 7/1993 | Wilkinson |
| 5,249,303 A | 9/1993 | Goeken |
| 5,285,470 A | 2/1994 | Schreiber |
| 5,289,272 A | 2/1994 | Rabowsky et al. |
| 5,311,302 A | 5/1994 | Berry et al. |
| 5,313,457 A | 5/1994 | Hostetter et al. |

(List continued on next page.)

FOREIGN PATENT DOCUMENTS

DE 199 57 299 A1 6/2001

OTHER PUBLICATIONS

International Search Report dated Dec. 21, 2001 for PCT/US02/39242, 5 pages.

Publication entitled "Field Experiment on Digital Maritime and Aeronautical Satellite Communication Systems Using ETS–V" by Y. Yasuda, M. Ohashi, F. Sugaya, M. Yasunaga and Y. Karasawa dated 1989.

Publication "ARINC wins support for AvSat program" by Bron Rek dated May 1987.

Publication "Applied Superconductivity" by Roger B. Poeppel, vol. 1, Numer 7–9, Jul.–Sep., 1993.

(List continued on next page.)

Primary Examiner—Chau Nguyen
Assistant Examiner—Andy Lee
(74) Attorney, Agent, or Firm—Harness Dickey & Pierce P.L.C.

(57) ABSTRACT

A method and apparatus for implementing closed loop power control for RF transmissions over a plurality of TDMA links. A data file including of the power level and time interval for each transmission from a given primary node to each one of a plurality of secondary nodes in a TDMA network is maintained in a buffer. Power level correction messages are transmitted by each secondary node back to the primary node indicating a power correction needed to maintain closure of a communication link with a given secondary node. The power level of subsequent transmissions from the primary node are modified such that only that amount of power needed to maintain closure of the link with each secondary node is used. Time stamp information from each secondary node is also used to update the buffer to ensure that power level corrections are being accurately applied. The system and method thus helps to avoid situations of interference with other non-target nodes or devices which might occur if a higher power level than necessary is used in communicating with each of the secondary nodes.

14 Claims, 3 Drawing Sheets

U.S. PATENT DOCUMENTS

| | | | |
|---|---|---|---|
| 5,430,760 A | * | 7/1995 | Dent .......................... 455/522 |
| 5,463,656 A | | 10/1995 | Polivka et al. |
| 5,495,258 A | | 2/1996 | Muhlhauser et al. |
| 5,524,272 A | | 6/1996 | Podowski et al. |
| 5,555,466 A | | 9/1996 | Scribner et al. |
| 5,568,484 A | | 10/1996 | Margis |
| 5,583,735 A | | 12/1996 | Pease et al. |
| 5,666,355 A | | 9/1997 | Huah et al. |
| 5,760,819 A | | 6/1998 | Sklar et al. |
| 5,790,175 A | | 8/1998 | Sklar et al. |
| 5,801,751 A | | 9/1998 | Sklar et al. |
| 5,806,003 A | | 9/1998 | Jolma et al. |
| 5,867,765 A | | 2/1999 | Nilsson |
| 5,884,164 A | | 3/1999 | Gerard et al. |
| 5,918,176 A | | 6/1999 | Arrington, Jr. et al. |
| 5,923,648 A | * | 7/1999 | Dutta .......................... 370/321 |
| 5,982,766 A | | 11/1999 | Nystrom et al. |
| 5,990,928 A | | 11/1999 | Sklar et al. |
| 6,005,513 A | | 12/1999 | Hardesty |
| 6,014,606 A | | 1/2000 | Tu |
| 6,034,634 A | | 3/2000 | Karlsson et al. |
| 6,047,165 A | | 4/2000 | Wright et al. |
| 6,072,792 A | | 6/2000 | Mazur et al. |
| 6,104,914 A | | 8/2000 | Wright et al. |
| 6,108,523 A | | 8/2000 | Wright et al. |
| 6,175,745 B1 | * | 1/2001 | Bringby et al. ............. 455/522 |
| 6,212,360 B1 | * | 4/2001 | Fleming et al. ............ 455/13.4 |

OTHER PUBLICATIONS

"Spread–spectrum signals used in global satellite navigation" by P. Daly, S.A. Dale, I.D. Kitching and G.R. Lennen.

"Airborne array antennas for satellite communication" by M. Yasunaga, F. Watanabe and T. Shiokawa.

"Airborne Phased Array Antenna for Mobile Satellite Communications" by T. Teshirogi, M. Tanaka and S. Ohmori.

Correspondence entitled "Propagation Results of Aeronautical Satellite Communication Experiments using INMARSAT Satellite"; vol. 28, No. 4, Oct. 1992.

"Aircraft Earth Station For Experimental Mobile Satellite System" by S. Ohmori, Y. Hase, K. Kosaka and M. Tanaka.

FCC application dated Feb. 16, 1987.

* cited by examiner

| Time Slot: | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Link: | B | C | D | B | C | D | B | C | D | B | C | D | B | C | D |

CLOSED LOOP POWER CONTROL FOR TDMA LINKS

FIELD OF THE INVENTION

The present invention relates to communication systems, and more particularly to a communication system employing a power control feature which allows the power of a signal transmitted from a first communication node to a plurality of secondary communication nodes to be maintained, in a closed loop fashion, within a predetermined range to thereby avoid interference with non-target nodes.

BACKGROUND OF THE INVENTION

In a communication system where at least one node, hereinafter designated "node A", is in communication with at least one secondary node, hereinafter referred to as "node B", the transmitting node A must transmit its signal with enough power to achieve an adequate signal-to-noise ratio at the receiving node B. However, if the signal transmitted from node A is transmitted with too much power, it may interfere with other nearby nodes or communication links that use the same frequency band. Moreover, a signal which is transmitted at a higher power level than necessary from node A to maintain closure of the communication link with node B would also make the device forming node A more vulnerable to hostile detection and interception in military applications. To achieve maximum use of scarce bandwidth and to minimize the probability of hostile detection and interception, the optimum solution would be for node A to transmit the signal with only enough power to maintain closure of the link to node B.

In a continuous radio frequency (RF) link using directional antennas, this optimal power level is achieved by using closed loop power control and bi-directional communication links. Node B monitors the incoming signal-to-noise ratio (or Eb/No). If the signal is too weak, then node B sends a message to node A telling it to increase power. If the signal is stronger than it needs to be, then node B sends a message telling A to reduce power. This allows node A to maintain the optimum power level despite changing conditions, such as rain absorption or multi-path fading. Concurrently, node A provides feedback to node B so that node B can control the power of its transmission.

In omnidirectional time division multiple access (TDMA) systems, this process has not been implemented. If power control is used at all in omnidirectional TDMA systems, it is of the open loop variety. One example is the power control scheme used in a TDMA cellular phone system. Each cell tower in this system transmits at constant power, with its power selected to cover a geographic area (i.e., a "cell"). Each phone in the system senses the incoming power from the cell tower. If the phone senses a strong signal it knows it is close to the tower so it uses low power for its transmission to the tower. If the phone senses a weak signal, it knows it is far from the tower, in which case it uses high power for its transmission. There is no closed-loop feedback from the tower to adjust the phone's power level.

Another example is the LINK-16 military TDMA network. This system is meant to communicate across a theatre of war. Nodes typically do not know the location of other nodes with which they are communicating, so every node transmits with enough power to reach from one corner of the theater to another.

Some TDMA satellite uplinks with directional antennas use closed-loop power control to compensate for rain. This allows the uplink to maintain adequate signal-to-noise ratio at the satellite without exceeding the interference limits for nearby satellites. The uplink from each ground terminal goes to only one satellite, so the ground terminal only has to keep track of one power setting. Only the uplink uses power control. The downlink beam typically covers many receivers, some of which may be receiving signals through rain and some of which will not. Therefore, the downlink (a one-to-many transmission) uses constant power with enough power margin to penetrate the rain an acceptable fraction of the time.

In a military application, wherein a large theater must be covered, node A may form TDMA links with over a dozen or more other secondary nodes (i.e., "B" nodes). Links from a single node A may be as short as one kilometer to a given node B or as long as 900 km to a different node C, with both distances occurring simultaneously. When the 900 km link must penetrate heavy rain and the one km link passes through clear sky, the power needed to close the long link may be nearly one million times greater than the power needed to close the short link. The communication links are formed preferably using phased array antennas manufactured by the assignee of the present application, which produce very narrow beams. If the short link to node B transmits at the same power as the long link, then nodes anywhere in close proximity to node B may be overwhelmed by the power of the A to B link, and thereby suffer interference from the A to B link.

The foregoing limitations thus give rise to a need for a communications scheme which assigns only as much power to a transmit beam from the first node as necessary to maintain closure of a communication link with a given second node. More specifically, there is a need for a power control scheme for use with a communications network in which a transmitting node (i.e., node A) is able to receive feedback regarding a signal strength of a receive signal received by a secondary node (i.e., node B), and wherein a power level of subsequent transmissions from node A are modified such that only a level of power is used with the transmitted signal which is needed to maintain closure of the communication link with the desired secondary node. Such a system would provide a closed loop power control system which would allow the power of signals transmitted from one node to be continually adjusted, as needed, to maintain closure of a communication link with a second node without potentially causing interference with other nodes in proximity to the second node.

SUMMARY OF THE INVENTION

The above and other objects are provided by a communication system incorporating a power control system in accordance with a preferred embodiment of the present invention. The communication system is formed in accordance with a multiplexing scheme in which at least one or primary node is able to communicate with a plurality of secondary nodes. In one preferred form, a TDMA communication system is implemented in which each secondary node is assigned a designated time slot in a TDMA cycle. The primary node maintains a data file associated with each secondary node. Each data file includes a record of the power level of each transmission (or "burst") made to each secondary node, together with a time interval during which the transmission is made. Each secondary node, upon receiving the transmission from the primary node, responds with a transmission which includes a power correction message. The power correction message indicates the needed change in the power level to just maintain closure of the communication link. The power correction message is received by the primary node and the power level of a subsequent signal to be transmitted from the primary node to that particular secondary node is either reduced or increased in accordance with the requested change in power.

Each data file maintained by the primary node, as mentioned above, includes a time interval for each transmission. In a preferred method, a secondary node transmitting back to the primary node also sends an indication of the time that the transmission from the primary node was received, as well as a "time stamp" indicating the time that the secondary node transmitted back to the primary node. Using this information, the primary node is able to "match" the signal strength information received from a given secondary node with a particular transmission which it has previously sent, and can therefore accurately determine whether or not the power level of a subsequent transmission to the secondary node needs to be adjusted. The time stamp transmitted by the secondary node also allows the primary node to update the time interval it maintains as to when a given transmission having a given power level has occurred.

The present invention thus enables a large plurality of communication links to be maintained with a plurality of secondary nodes, and wherein each secondary node provides signal strength information to a primary node with which it is in communication with to allow a closed loop power control scheme to be implemented. The closed loop power control scheme provides accurate, real time control over the power level of transmissions from a primary node to each one of a large plurality of secondary nodes. Thus, only that level of power needed to maintain closure of the communication links with each of the secondary nodes is used by the primary node.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figures 1, 2:
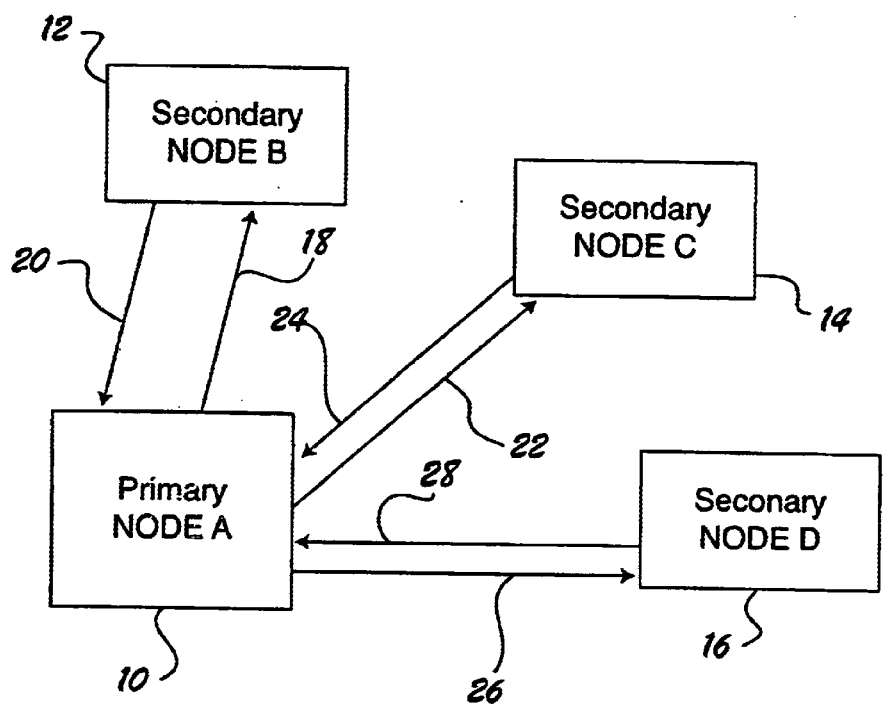
FIG. 1 is a simplified drawing of a communication network illustrating one primary node and three secondary nodes, which with the communication system of the present invention may be used.
FIG. 2 is a drawing illustrating one exemplary TDMA cycle for three secondary nodes, and the time slots that each node is assigned for communication with a primary node.

Referring to FIG. 1, there is shown a primary node A 10 which is in communication with a secondary node B 12, a secondary node C 14 and a secondary node D 16. The secondary nodes 12–16 may be located at varying distances from primary node A and subjected to significantly varying weather conditions which affect RF signals transmitted to and from them. It will also be appreciated that in practice, a plurality of primary nodes may be employed which are in communication with a much larger plurality of secondary nodes. Thus, the illustration of only a single primary node and three secondary nodes should be understood as being for illustrative purposes only.

Primary node A forms an RF transmitting device that transmits an RF signal 18 to secondary node B 12. Upon receiving this signal, secondary node B 12 transmits a signal 20 back to primary node A 10. Similarly, the primary node 10 transmits an RF signal 22 to secondary node C 14. Secondary node C then transmits a reply RF signal 24 back to primary node A 10. Primary node A 10 also transmits an RF signal 26 to secondary node D 16. Upon receipt of this signal, secondary node D 16 transmits a reply signal 28 back to primary node A 10. A principal object of the present invention is to transmit the RF signals 18, 22 and 26 with only that amount of power required to maintain closure of the communication link between the primary node A 10 and each of the secondary nodes 12, 14 and 16. Since the secondary nodes 12, 14 and 16 will typically be located at varying distances from primary node A 10 (possibly separated by hundreds of kilometers), the power level of the RF signals 18, 22 and 26 will typically vary. Furthermore, since the secondary nodes 12, 14 and 16 may be subjected to significantly different weather conditions (i.e., rain) which affect the transmission of RF signals therefrom, it will be appreciated that further adjustments may be required to the power levels associated with RF signals 18, 22 and 26 to maintain closure of the communication links with the secondary nodes 12, 14 and 16 during inclement weather conditions. The ability to closely control the power level of the RF signals 18, 22 and 26 transmitted from the primary node 10 is of high importance in preventing interference by the RF signals 18, 22 and 26 with other nodes or communication devices which may be located in close proximity to each of secondary nodes 12, 14 and 16. In a military application, where dozens or more primary nodes may each be in communication with a dozen or more secondary nodes, the importance of avoiding interference with non-target nodes in close proximity to a target node becomes extremely important.

The communication system of the present invention further makes use of a multiplexing scheme, and in one preferred form a time division multiple access (TDMA) scheme, for communicating with each of the secondary nodes 12, 14 and 16. Referring to FIG. 2, one exemplary TDMA cycle is illustrated in which secondary node B 12 is assigned time slots 1, 4, 7, 10 and 13. Secondary node C 14 is assigned time slots 2, 5, 8, 11 and 14. Secondary nodes D 16 is assigned time slots 3, 6, 9, 12 and 15. When the RF link 18 to node B 12 is first established, node A 10 establishes the time slots for a transmission to node B 12. Likewise, when RF link 22 is first established to secondary node C 14, primary node A 10 establishes which TDMA time slots will be used to communicate with secondary node C. Also, when RF link 26 is first established, then primary node A 10 establishes which TDMA time slots will be used to communicate with secondary node D 16. Thus, RF links 18, 22 and 26 may also be viewed as "TDMA links".

When primary node A 10 establishes RF link 18 with secondary node B 12, primary node A completes a data structure or record as indicated below:

| | |
|---|---|
| Node: | B |
| PAA pointing: | 5.2° azimuth, 20.5° elevation |
| Transmit Power: | 12.2 Watts |

The field "PAA Pointing" indicates the pointing direction of a phased array antenna associated with primary node A 10 and includes the azimuth and elevation angles for the antenna. The field entitled "Transmit Power" represents the power of the initial or last transmission from the primary node A 10 to the secondary node B 12. It will be appreciated that a record such as that shown above for node B will also be created and maintained for secondary node C 14 and secondary node D 16, and for any other nodes with which the primary node A 10 is in communication with.

When a given RF link 18, 22 or 26 is first formed, the value stored in the "transmit power" field of the record associated with that particular secondary node is determined by user-specified rules. For example, the initial power might be a user-defined constant or determined by a suitable system for calculating an initial power as a user-defined function of the range to a specific secondary node.

It will also be appreciated that the present invention requires a means to remember power settings. In one preferred form, this is accomplished via software. Alternatively, suitable hardware such as a data register or a capacitor voltage may be used to form a means for remembering power settings.

Figure 3:
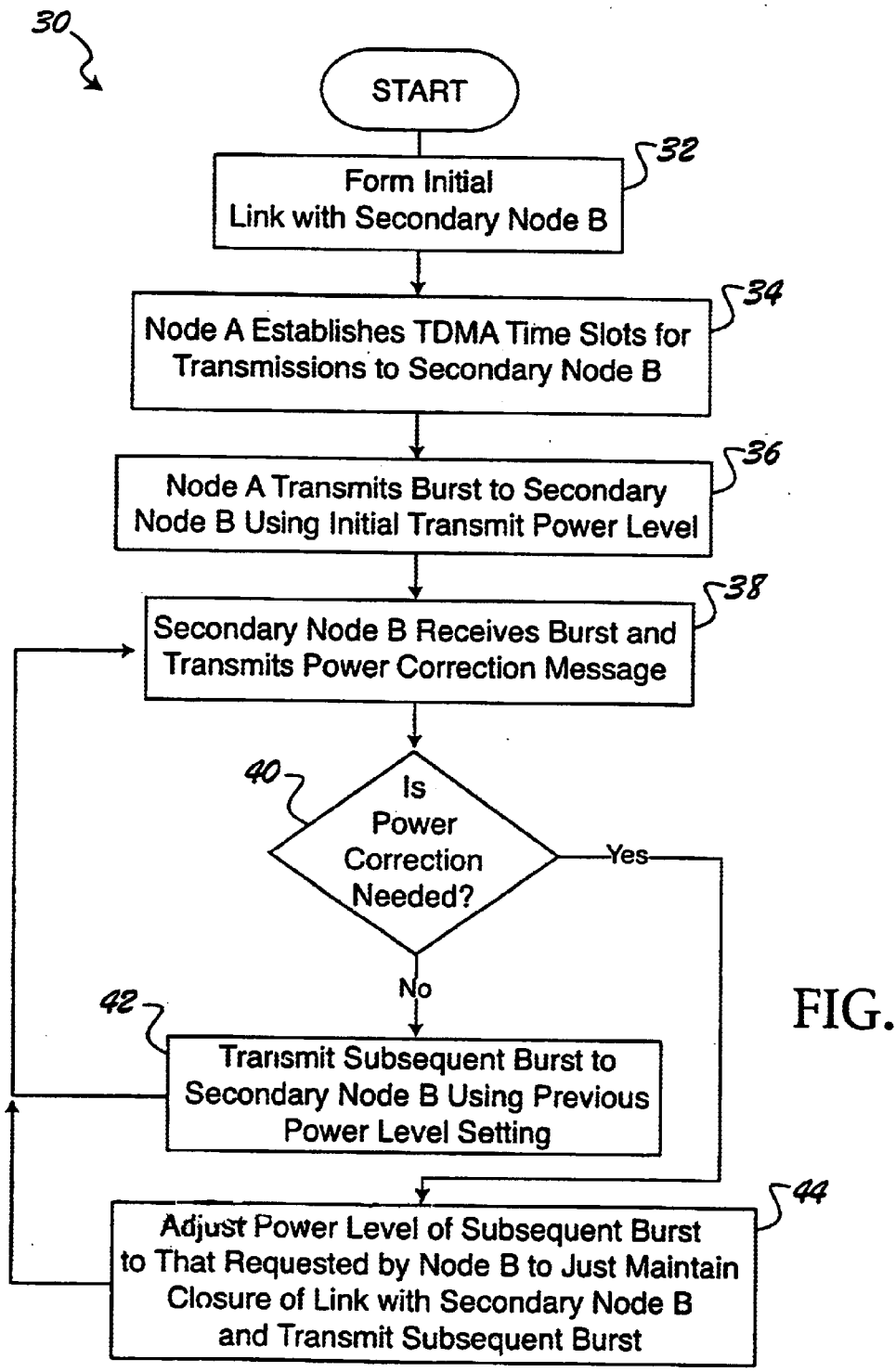
FIG. 3 is a flowchart of the basic steps of operation performed by the method of the present invention.

Referring now to FIG. 3, a flow chart 30 illustrates the steps performed by one preferred method of the present invention. Flow chart 30 illustrates the steps performed in adjusting the power level of transmissions to one particular node, in this example node B 12. Initially, primary node A 10 forms an initial communication link with secondary node B 12, as indicated at step 32. Node A 10 establishes TDMA time slots for transmission to node B 12, as indicated at step 34. The initial transmission (i.e., "burst") to secondary node B 12 uses the initial transmit power level stored in the record for transmissions to node B 12, as indicated at step 36. It will be appreciated that the antenna of node A 10 is aimed at node B 12 prior to the transmission occurring.

The secondary node B 12 receives the burst and transmits a signal (i.e., message) back to node A 10 concerning needed change in the transmit power level of the burst from node A 10, as indicated at step 38. For explanatory purposes, this will be referred to as the "power correction message". This message may be sent via some other node which is in communication with node A 10 or via any other suitable system, such as an omnidirectional system used for initial discovery of other nodes. When node A 10 receives the transmission from secondary node B 12, it determines if its power level matches that specified in the power correction message and, if so, determines that no power correction is needed, as indicated at step 40. The next transmission to node B 12 will then use the same power level as indicated at step 42. If the test at step 40 indicates that more power than necessary is being used to transmit the burst from node A 10, or that insufficient power is being used, then the power level of the subsequent burst to secondary node B 12 will be adjusted accordingly such that only that amount of power needed to maintain closure of the communication link with secondary node B is used. This is indicated at step 44.

The present invention 30 thus forms a closed loop system wherein feedback of the receive signal strength of the bursts transmitted from node A 10 to the secondary node B 12 are continually received by node A 10 from node B 12 and used to continuously modify the power level of future bursts from node A 10. Continuous power level correction is performed in real time to assure that only that amount of power needed to maintain closure of the communication link with secondary node B 12 is used with each burst to secondary node B 12. It will be appreciated that this operation is performed with each node with which primary node A 10 is in communication with. For the exemplary system shown in FIG. 1, the process described in connection with FIG. 2 will be used with each of secondary nodes B 12, C 14 and D 16.

The method set forth in flowchart 30 is suitable for those applications where node B 12 is able to measure the signal-to-noise ratio of a given burst "N" from primary node A 10 and to send a power correction message that reaches node A 10 before node A 10 sends bursts N+1. In such a network, primary node A 10 always knows that a power correction message from secondary node B 12 indicates a correction to the power used in nodes A's most recent burst to secondary node B 12. However, in a more complex network, secondary node B 12 may receive several bursts (e.g., N through N+M) before primary node A 10 receives the correction message for burst N. In that case, a more complex power control monitoring system and method is needed. Such a method is illustrated in flowchart 46 set forth in FIG. 4. This alternative preferred method of the present invention makes use of a more complex data file, as shown below:

| | |
|---|---|
| Node: | B |
| PAA pointing: | 5.2° azimuth, 20.5° elevation (example) |
| FIFO buffer of records: | |
| Transmit Power: | 12.2 Watts (example) |
| Power Start Time: | 02:32:37.9982 (example) |
| Power End Time: | 02:32:38.0036 (example) |
| Transmit Power: | 15.0 Watts (example) |
| Power Start Time: | 02:32:38.0037 (example) |
| Power End Time: | TBD (example) |

The above data file is maintained in a first-in-first-out (FIFO) buffer associated with primary node A 10. Stored in this buffer are records of each transmit power level used in recent bursts from node A 10 to secondary node B 12 and the time interval over which each power level was used. The time interval may be represented as a time slot number of the TDMA cycle or possibly as an interval which is shorter than the duration of a single time slot time interval. In the above exemplary data file, a first record of a transmit power of 12.2 watts is indicated as starting at one time (02:32:37.9982). A second record of a burst having a power of 15.0 watts is indicated as starting 0.0055 seconds later (at 02:32:38.0036). Therefore, the interval during which the transmit power was 12.2 watts extends from 02:32:37.9982 to 02:32:38.0336. The interval with the 15.0 watts of power starts in the following 100 microsecond time slot and is indicated as not yet having ended.

Figure 4:
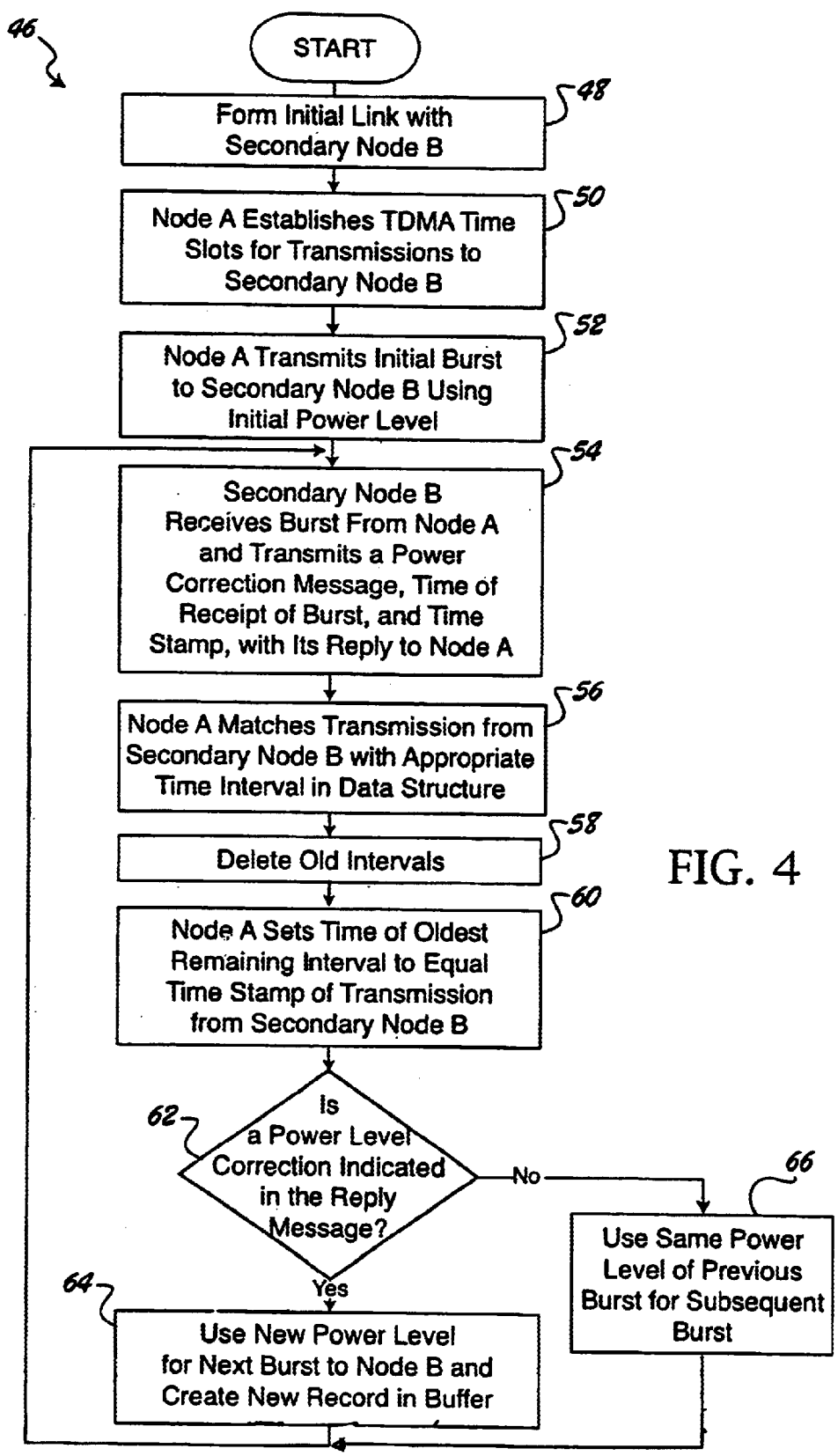
FIG. 4 is a flowchart of an alternative preferred method of the present invention.

Referring further now to the flowchart 46 of FIG. 4, an initial link with secondary node B 12 is established by node A 10, as indicated at step 48. Node A 10 at this time also establishes TDMA time slots for transmissions to secondary node B 12, as indicated at step 50. Node A 10 transmits a burst to secondary node B 12, as indicated at step 52, using an initial power level which in this example is 12.2 watts. At step 54, secondary node B 12 receives the burst from node A 10 and transmits a power correction message to node A 10, a "time of receipt" of the received burst, and a "time stamp" indicating when it has transmitted this information back to node A 10, as indicated at step 54. Node A 10 then matches the transmission from secondary node B 12 with the appropriate time interval record in the data file, as indicated at step 56, to determine the time (or time slot) of the burst from node A 10 to which secondary node B 12 is responding. If the transmission from node B 12 indicates that it is responding to a burst that is more recent than the starting time of any interval stored in the FIFO buffer, then node A 10 deletes the record of every interval whose ending time precedes the time-stamp of the transmission from secondary node B 12, as indicated at step 58. Node A 10 then sets the time of the oldest remaining interval in the data file stored in the FIFO buffer to equal the time stamp of the transmission from secondary node B 12, as indicated at step 60. Node A 10 then checks to determine if a power level correction is indicated in the message received from secondary node B 12, as indicated at step 62. If a power level correction is being requested by secondary node B 12, then node A 10 adjusts to create a new record for the next burst to node B 12 which has the power level value indicated by node B 12, and also sets the start time for that new, subsequent interval as the beginning of the next TDMA time slot, as indicated at step 64.

If the power level correction message indicates that no power level adjustment by node A 10 is required, then the same power level will be used in the subsequent burst to node B 12, and the new record created for the next burst to node B 12 will have the same power level designation as indicated in step 66.

Step 64 ensures that node A 10 only adjusts its transmit power in response to the most recent available feedback. If the transmission from secondary node B 12 responds to a burst from node A 10 that is more recent than the end time of one or more intervals in the data file stored in the FIFO buffer, then the old intervals (i.e., records) are deleted. The starting time of the remaining interval is then set equal to the time stamp of the transmission from secondary node B 12. This means that the earliest start time of any interval in the FIFO buffer matches the time stamp of the most recent transmission from secondary node B 12. If a transmission from secondary node B 12 responds to a burst that is older than the start time of the earliest record in the FIFO buffer, then node A 10 ignores the message.

The reason for using time stamps on power correction messages from secondary node B 12 to node A 10 is that these messages might arrive concurrently or out of sequence at node A 10. If two consecutive feedback messages are packed into the same TDMA burst from secondary node B 12 to node A 10, the two would arrive concurrently. However, if one or both of the messages are relayed through other intermediate nodes, they could conceivably arrive in reverse order. Time stamps on the transmissions from the secondary node B 12 ensure that only the most recent feedback from node B 12 is used by node A 10 in adjusting the power level of future bursts. Time stamps and records of power used on earlier bursts from node A 10 ensure that feedback received from secondary node B 12 is applied by node A 10 to the correct power level.

As a further example of the method set forth in FIG. 4, assume that the method uses 100 microsecond TDMA time slots in a 10 millisecond TDMA cycle. If secondary node B 12 receives a weak burst from node A 10 in time slot 7, it sends a correction message to node A 10 specifying how much to increase the power (e.g., 0.897 dB) and telling node A 10 the time of the weak burst (e.g., 02:32:38.0007, which corresponds to the interval of the 12.2 watt transmission). How node A 10 responds depends on when the transmission from secondary node B 12 is received by node A 10. If node A 10 receives the transmission from node B 12 before the end of the 12.2 watts interval (i.e., before the 15 watt record has been added to the FIFO buffer), then A will record the time stamp of the message from secondary node B as the start time of the 12.2 watts interval. Node A 10 will also note the time of receipt of the transmission from secondary node B 12 as the end time of the 12.2 watts interval. Node A 10 will then create a new record specifying the adjusted power level (i.e., 15.0 watts) and the starting time of the new power level (i.e., the next TDMA time slot). This new record is recorded in the FIFO buffer. If node A 10 receives the transmission from secondary node B 12 after node A 10 has already increased the power to 15.0 watts in response to an earlier transmission from secondary node B 12, then node A 10 does not change the power level. Instead, node A 10 updates the start time of the 12.2 watts interval if the time stamp of the transmission from secondary node B 12 is more recent than the current start time of the interval.

If secondary node B 12 receives an even weaker burst from primary node A 10 in time slot 15 (which is still during the time interval during which the 12.2 watts transmission is occurring), it sends another power correction message to node A 10. This message specifies a power increase of 1.5 dB and a time stamp of 02:32:38.0015. If node A 10 receives the transmission from secondary node B 12 about TDMA slot 15 after the message regarding TDMA slot 7, then node A 10 will already be using a transmit power of 15.0 watts. Increasing power by 1.5 dB above that value would be an error. However, node A 10 knows from the time stamp in the message from secondary node B 12 that the requested increase of 1.5 dB was for a burst sent during the 12.2 watts interval, not the current 15.0 watts interval. Node A 10 therefore marks the end of the 15.0 watt interval and creates and buffers a new record with a transmit power of 17.2 watts (i.e., 1.5 dB greater than 12.2 watts). Node A 10 then updates the start time of the 12.2 watts interval using the time stamp of the transmission from secondary node B 12.

If node A 10 happens to receive the transmission from node B 12 regarding TDMA slot 15 out of sequence (i.e., before it receives the message about TDMA slot 7), then node A 10 will still be using the 12.2 watts of transmit power. However, node A 10 can determine from the time stamp of the transmission from secondary node B 12 that the requested increase of 1.5 dB is relative to the current power level. Node A 10 then marks the end of the 12.2 watt interval and then creates a 17.2 watt record with its start time equal to the next TDMA time slot. If the message concerning TDMA slot 7 arrives sometime later, node A 10 ignores it because node A 10 knows that this message is out of date.

It will also be appreciated that when forming the initial link with secondary node B 12, if node A 10 does not receive a power correction message (or other acknowledgement), from secondary node B 12, it assumes that it, as well as secondary node B 12, are both using inadequate transmit power. Node A 10 then incrementally increases the transmit power level for bursts to secondary node B 12. Secondary node B 12 may perform the same process. Eventually, both node A 10 and node B 12 reach a power level that the other can receive or, if the user specified power level bounds are exceeded, then both nodes abandon the link.

The present invention thus enables a communication network employing TDMA links to effectively re-use spectrum (i.e., bandwidth) as efficiently as synchronous links. This allows the benefit of TDMA links, such as multiple links per beam, fewer hops per packet, and link capacity which is adjustable to match the traffic on any given link.

Recent simulations indicate that the use of TDMA links for a network backbone can improve network throughput by 15% to 100% and reduce latency by about 25% compared to synchronous communication links.

Importantly, the present invention, by precisely controlling the power level of transmissions from a backbone node to each of a plurality of other nodes, in real time, can avoid instances of interference with other, non-target, nodes or RF devices operating in the proximity to one or more target nodes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for controlling a transmit power of a signal transmitted from a first communication node to a plurality of secondary communication nodes communicating with said first node, in closed loop fashion, in accordance with a multiplexed communication scheme, said method comprising:

using said first node to transmit a signal to a selected one of said secondary nodes;

creating a data file for said transmitted signal, said data file including a transmit power level value indicative of a power level of said transmitted signal and a time interval during which said transmitted signal has occurred;

using said selected secondary node to receive said transmitted signal;

causing said selected secondary node to transmit back to said first node a power correction message indicative of a needed change in a power level of said transmitted signal, an indication of when said transmitted signal was received in time, and a time stamp indicating a time that said power correction message was transmitted; and using said power correction message and said indication of when said transmitted signal was received to determine which one of said transmitted signals said power correction message corresponds to, and a degree of power level adjustment needed to be applied to said corresponding transmitted signal, in real time, to maintain a minimum predetermined received signal strength for a subsequently transmitted signal to said selected secondary node.

2. The method of claim 1, wherein a plurality of transmitted signals are transmitted to said secondary communication nodes in accordance with a time division multiple access (TDMA) communications scheme.

3. The method of claim 1, wherein said data file is updated to reflect a time of receipt of said power correction message from said selected secondary node.

4. A method for controlling a transmit power of a signal transmitted from a first communication node to a plurality of secondary communication nodes communicating with said first node, in closed loop fashion, in accordance with a multiplexed communication scheme, said method comprising:

using said first node to transmit a signal to each one of a plurality of secondary nodes in accordance with said multiplexed communication scheme;

maintaining a buffer having a data file of each transmission to each of said secondary nodes, said data file including a power level of said signal transmitted to each of said secondary nodes;

using each of said secondary nodes to receive its associated said signal from said first node;

causing each one of said secondary nodes to transmit back to said first node, a power level correction message indicative of a needed correction in a power level of a subsequent transmission from said first node;

causing said first node to adjust a power level of a subsequently transmitted signal to any one of said secondary nodes whenever said power correction message received from one of said secondary nodes indicates that said power level in said data file associated with a given said secondary node needs to be adjusted to maintain a signal strength of said signal received by said given secondary node within a predetermined signal strength range; and updating said data file associated with said given secondary node to reflect the most recent power level of said signal transmitted to said given secondary node.

5. The method of claim 4, wherein said method further comprises:

maintaining a time of transmission with each said data file, said time of transmission indicating the time at which the most recent said transmission was sent to each of said secondary nodes.

6. The method of claim 4, wherein said method further comprises:

maintaining a start time of each said transmission and an end time of each said transmission in each said data file.

7. The method of claim 4, wherein said multiplexed communication scheme comprises a time division multiple access (TDMA) scheme; and wherein each of said secondary nodes are assigned a specific time slot by said first node, in accordance with said TDMA scheme.

8. A method for controlling a transmit power of a signal transmitted from a first communication node to a plurality of secondary communication nodes communicating with said first node, in closed loop fashion, in accordance with a multiplexed communication scheme, said method comprising:

using said first node to transmit a signal to each one of said secondary nodes;

creating a plurality of data files, each said data file being associated with one of said secondary nodes, each said data file including a time interval and a power level for each said transmission to its associated said secondary node;

using said secondary nodes to receive said transmitted signals;

causing each said secondary node to transmit back to said first node a power correction message indicative of a needed change in a power level of a signal transmitted from said first node, and an indication of when said transmitted signal was received in time; and using said power correction messages received from said secondary nodes to adjust said power levels contained in said data files for each of said selected nodes to maintain a received signal strength of said signals received by said secondary nodes within predetermined desired ranges; and updating said data files to reflect a most recent power level and time of transmission for each said transmitted signal to each said secondary node.

9. The method of claim 8, wherein each said secondary node applies a time stamp to said signals transmitted therefrom to apprise said first node of a time that a given one of said transmitted signals from said first node was received.

10. The method of claim 8, wherein said communications scheme comprises a time division multiple access (TDMA) scheme.

11. The method of claim 10, wherein each said secondary node is assigned a time slot during which it communicates with said first node.

12. A method of controlling a transmit power of a signal transmitted from a first communication node to a plurality of secondary communication nodes communicating with said first node, in closed loop fashion, said method comprising:

using said secondary nodes to receive signals transmitted by said first node;

causing each said secondary node to transmit back to said first node a power correction message indicative of a needed change in a power level of a subsequent transmission to be made from said first node;

maintaining data files of transmissions from said first node to each of said secondary nodes, said data files including a power level of each said transmission and a time interval during which each said transmission is made;

using said power correction message and said time interval to determine which one said transmitted signals said power correction message corresponds to;

matching said power correction messages from each of said secondary nodes to specific ones of each of said previously transmitted signals from said first node compiled in said data files; and using power level information stored in said data files to modify subsequent transmissions to said secondary nodes based on said power correction messages received by said first node from each said secondary node to adjust a power level of each of said subsequent transmission to maintain said subsequent transmissions within predetermined power ranges.

13. The method of claim 12, wherein each said record comprises a time interval associated with each said transmission to a given one of said secondary nodes.

14. The method of claim 12, wherein each said record comprises a power level of at least a last one of said transmissions from said first node to a given one of said secondary nodes.

* * * * *